Nov. 10, 1936.  F. O. FERNSTRUM  2,060,187
MARINE ENGINE TEMPERATURE CONTROL
Filed Dec. 8, 1933  2 Sheets-Sheet 1

INVENTOR
Frank O. Fernstrum,
BY
ATTORNEYS

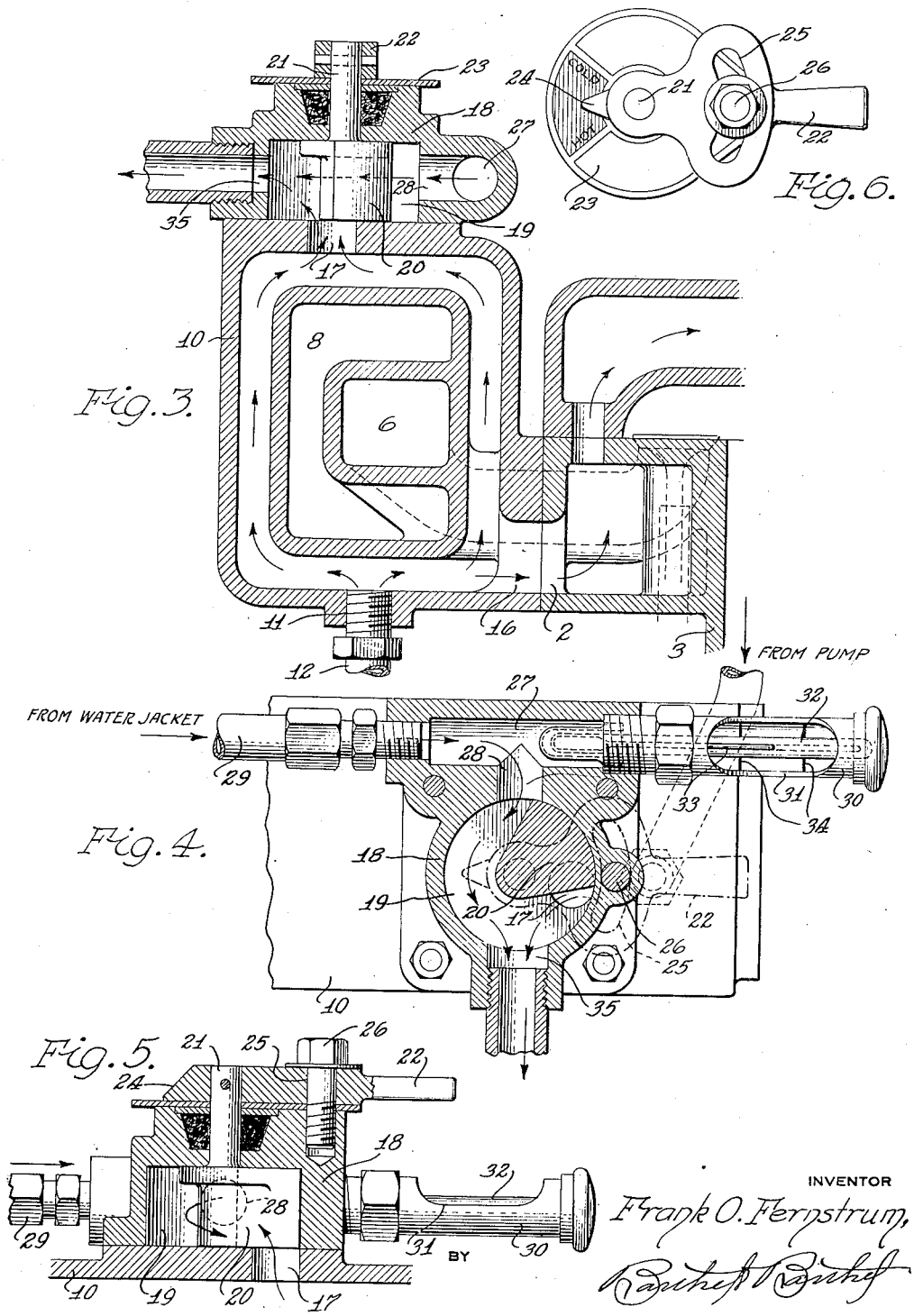

UNITED STATES PATENT OFFICE 2,060,187

MARINE ENGINE TEMPERATURE CONTROL

Frank O. Fernstrum, Detroit, Mich., assignor to Gray Marine Motor Co., Detroit, Mich., a corporation of Michigan Application December 8, 1933, Serial No. 701,561

7 Claims. (Cl. 123—178)

The present invention pertains to marine engines, and more particularly to means for regulating the temperature of internal combustion engines constructed and used for marine purposes.

Internal combustion engines of the marine type are ordinarily constructed with cooling systems including a water jacket surrounding or adjacent to the explosion chambers and are ordinarily provided with pressure means for circulating water through the jacket in order to maintain the engine block at the most efficient temperature during operation of the engine. The water which is circulated through the conventional cooling system thus constructed is drawn in through a sea cock located beneath the water line of the boat carrying the engine and the water thus drawn in is circulated at a rate of flow directly proportional to the speed of operation of the engine, due to the fact that the pump is operated by the engine. Obviously, the temperature of the water as it is pumped into the circulating system governs the temperature of the engine block and if the temperature of the water varies the temperature of the engine varies likewise inasmuch as the volume of water pumped remains substantially constant at any given speed of engine operation. Therefore such a cooling system does not permit maximum efficiency of the internal combustion engine due to the fact that the temperature of the water varies over a comparatively wide range as a result of varying climatic conditions and different geographical locations, and under one set of climatic and geographical conditions might be ideal for a given engine but a variance of either condition would result in either overheating of the engine or operation while it is too cool, either of which are known to result in loss of efficiency.

The primary object of the present invention is to provide means for regulating the temperature of an internal combustion engine used for marine purposes so that the maximum efficiency may be realized therefrom during operation under varying climatic conditions and in different geographical locations. The invention includes the use of the conventional water cooling system insofar as it embodies the water jacket adjacent to the explosion chambers and in combination therewith provides means for regulating the flow of water through the water jacket so that such flow may be adjusted to a high rate to prevent overheating of the engine or to a low rate to prevent the temperature from dropping too low. Thus if the temperature of the water entering the cooling system is comparatively high the volume pumped through the water jacket may be increased, and if the water should happen to be comparatively cool the volume pumped through the water jacket may be proportionately decreased. The invention contemplates the use of a pump in order to provide forced circulation of the cooling water and in this connection it is another object of the present invention to provide means for regulating the water flow which functions in a manner to avoid placing any additional burden upon the water pump. In other words the regulating means is not in the nature of an obstruction which would have any tendency of building up a back pressure on the water that would be harmful to the pump or tend to cause excessive wear and thus decrease the useful life thereof.

Another object of the present invention is to provide, in combination with temperature regulating means for internal combustion engines of the marine type, or in other words in engines wherein there is no closed water circulating system such as is commonly used in automotive vehicle engines, means for visibly indicating to the operator the temperature conditions under which the engine is operating. Thus if temperature conditions are too low or too high to permit realization of the maximum output of the engine the temperature may be adjusted to correct such adverse conditions and the indicating means, which is in the form of a thermometer, provides means for ascertaining whether or not the correct amount of adjustment has been made to provide the desired regulation in temperature.

Still another object of the present invention is to provide temperature regulating means for marine engines to facilitate operation thereof at the most efficient temperature regardless of changing conditions which are present in the engine itself, which conditions influence the temperature of the engine. For example the friction present in the moving parts of a new engine results in the generation of more heat than will be generated after the engine has been in use over a period of time. Another example is in the case where boats are operated in unclean or muddy waters, or in other words in waters wherein abrasive particles are in suspense, because water in such condition causes rapid wear of the water pump and reduces the efficiency thereof. Such reduction in efficiency of the water pump, unless compensated for, results in a less efficient water circulating system and a change in the temperature of the engine.

With the above and other ends in view the invention consists in matters hereinafter set forth and more particularly pointed out in the appended claims, reference being had to the accompanying drawings, in which Figure 1 is a top plan of a marine engine with the present device associated therewith;

Fig. 2 is a side elevation wherein certain parts are broken away and in cross section;

Figs. 3 and 4 are cross sections taken on the lines 3—3 and 4—4 respectively of Fig. 2;

Fig. 5 is a cross section taken on the line 5—5 of Fig. 1, and

Fig. 6 is a plan of a detail.

Like characters of reference are employed throughout to designate corresponding parts.

Figure 1:
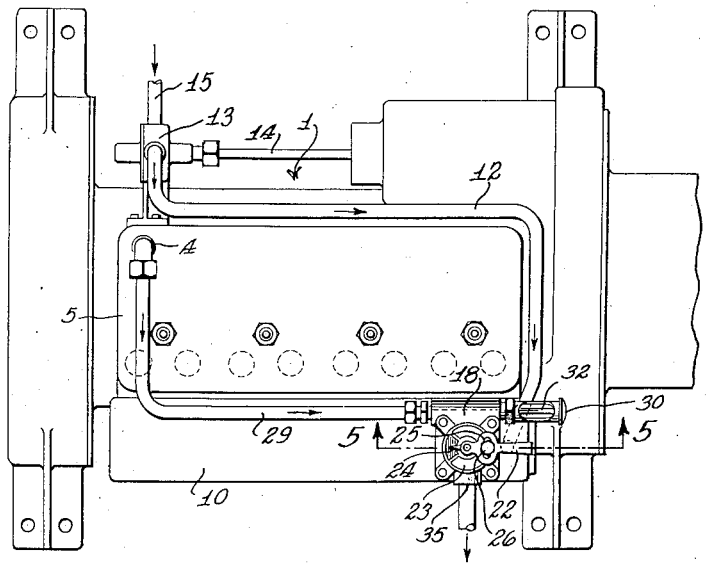
Figure 2:
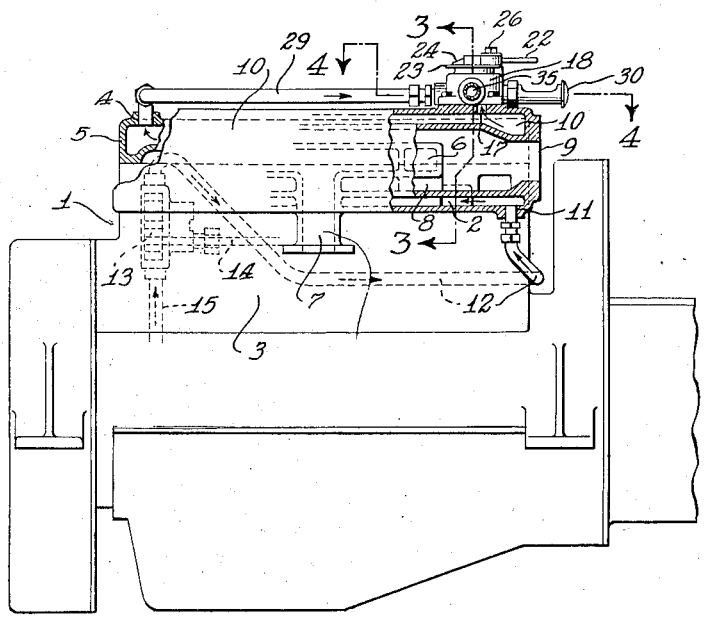

With reference more particularly to Figs. 1 and 2 the numeral 1 generally designates a marine engine of the internal combustion type. Such engines are well known in the art and accordingly it has not been deemed necessary to illustrate the same in detail, it being understood that the engine includes the usual chambers wherein heat is generated during operation of the engine. The engine is also provided with a conventional water jacket which, as is well known in the art, comprises channels or passages located adjacent to the explosion chambers so that water circulated through such passages carries away the heat generated by the explosions or combustion of gases in the chambers. The entering port of the water jacket is designated by the numeral 2 in Fig. 2 and is shown in the side of the engine block 3. The exhaust port of the water jacket is designated by the numeral 4 and is shown in the top of the engine head 5.

Located at the side of the engine 1 is an intake manifold 6 having a tubular extension 7 to which a carburetor (not shown) is connected. Surrounding the intake manifold 6 is an exhaust manifold 8 having an outlet port 9 adapted to have an exhaust pipe (not shown) connected thereto. Surrounding the exhaust manifold 8 is a water casing 10 having an inlet port 11 connected by a pipe line 12 to a water pump 13. As illustrated by way of example in Fig. 2 the pump 13 is of the meshing gear type and is operated by a shaft 14 in the engine 1, it being preferable that the shaft 14 be so connected to the crank shaft of the engine that it is driven at all times while the engine is operating. A supply line 15 has one end connected to the intake port of the pump 13 and its other end, which is broken away, is adapted to open through a conventional sea cock in the side or bottom of a boat and located beneath the water line.

From the foregoing it becomes apparent that the water casing 10 is constantly supplied with water by the pump 13 and that the water thus applied is taken from the body of water supporting the boat in which the engine 1 is to provide the source of power. As above stated, the temperature and quality of the water thus supplied will vary over a comparatively wide range as a result of changing climatic and geographical conditions.

The water casing is provided with an outlet port 16 registering with the entering port 2 of the water jacket and with an outlet port 17 in the top wall thereof. A valve body 18 is secured on the top wall of the water casing and is formed with an annular chamber 19 into which the port 17 opens. A valve plug 20 of sector shape is rotatably mounted in the valve chamber 18 and is provided with an upwardly extending stem 21 having an operating handle 22 secured thereto. Secured beneath the handle 22 is an indicia bearing plate 23 and a pointer 24 is carried by the handle to cooperate therewith. The handle 22 is formed with an arcuate slot 25 receiving a bolt 26 that is screwthreaded into the top of the valve body. The bolt 26 when loosened serves to limit the rotative movement of the valve stem 21 caused by manual movement of the handle 22 and when tightened serves to hold the handle against accidental movement. As shown more clearly in Fig. 4 the sector shaped valve plug 22 is so arranged that it obstructs the port 17 and in this connection it is desirable in order to render the device fool proof that the slot 25 and bolt 26 be so arranged that it is impossible for the valve to entirely close the port 17.

The valve body 18 is formed with a T shaped passage 27 which enters the valve chamber 19 through the side thereof as designated at 28. The passage 28 is arranged with relation to the sector valve 20 and port 17 so that movement of the valve 20 to uncover the port 17 causes the valve to partially cover or obstruct the passage 28. The slot and bolt limit the movement of the handle so that it is impossible to entirely obstruct the passage 28. One end of the passage 27 is connected by a pipe line 29 to the water jacket outlet port 4 and the other end has a thermometer screwthreaded therein. The thermometer comprises a housing 30 having an opening 31 therein through which a glass tube 32 is exposed. In the glass tube is a column of mercury designated 33 which cooperates with a colored portion located between the lines 34 and thus provides means for indicating whether or not the temperature of the engine is within a desired range.

In operation the water pumped through the sea cock by the pump 13 enters the water casing 10 through the intake port 11. In the water casing there are provided two outlets 16 and 17. If the water leaves the water casing 10 through the outlet 16 it enters the port 2 and is circulated through the water jacket which it leaves through the port 4. Water leaving the port 4 is conveyed by the pipe line 29 to the passage 27 and through passage 28 to the valve chamber 19. An outlet port 35 in the valve body 18 is at all times open and unrestricted and the water is free to leave the valve body therethrough. A portion of the water in the water casing at the same time leaves the same through the outlet port 17 and is also discharged from the valve body through the outlet port 35. Thus a by-pass is provided and by adjusting the position of the valve 20 to uncover the port 17 and at the same time cover the passage 28 the amount of water flowing through the water jacket is decreased in volume and a temperature regulation takes place.

The outlet port 16, it will be noted, is located in close proximity to the intake port or supply port 11 of the water casing and therefore when the outlet port 17 is almost entirely obstructed by the valve 20 the water entering the water casing flows directly through the port 2 to the water jacket and has maximum cooling effect. Such a function would be desirable when operating the engine during a summer season or in tropical locations. When the passage 28 is almost entirely obstructed the major portion of the water entering the water jacket would leave the same through the outlet 17 and would not, therefore, be circulated through the water jacket. This mode of functioning would be desirable when operating the engine during cold seasons or in cold geographical locations.

Thus it becomes apparent that the amount of water circulating through the water jacket is subject to control and therefore when the thermometer indicates that the temperature is higher or lower than that at which the maximum efficiency may be obtained from the engine such temperature conditions may be corrected. Furthermore it becomes apparent that the device is fool proof inasmuch as it is impossible to entirely obstruct the flow of water through the water jacket of the engine.

Although a specific embodiment of the present invention has been illustrated and described it is to be understood that various changes may be made in the details of construction without departing from the spirit of the invention as defined by the scope of the appended claims, and such changes are contemplated.

What I claim is:—

1. In combination with an internal combustion engine having a water circulating system and an exhaust manifold, of a casing covering said manifold, means for pumping water into said casing, means connecting said casing with the inlet end of said water circulating system, a manually operable valve, means connecting an outlet in said casing and the outlet of said water circulating system with said valve, said valve being operable to divert a regulated amount of water from said casing through said circulating system, and means for limiting movement of said valve whereby to maintain at least a minimum flow through said circulating system at all times.

2. In combination with a marine engine having a water circulating system with an inlet and an outlet, a water casing, said water casing having a manifold therein adapted for reception of exhaust gases from said engine and being substantially surrounded by said casing, said casing having an inlet port, water pumping means connected to said inlet port, said casing having an outlet port and being secured to said engine with its outlet port communicating with the inlet of said water circulating system, said casing having a second outlet port, a valve body secured to said casing and having a chamber therein communicating with said second casing outlet, a valve plug in said chamber and movable therein across said second casing outlet, said valve body having an outlet out of the normal path of movement of said valve plug, said valve body having an inlet adapted to be partially covered by said valve plug, means connecting said valve body inlet to the outlet of said water circulating system, and means external of said valve body for moving said valve plug.

3. In combination with a marine engine having a water circulating system with an inlet and an outlet, a water casing, said water casing having a manifold therein adapted for reception of exhaust gases from said engine and being substantially surrounded by said casing, said casing having an inlet port, water pumping means connected to said inlet port, said casing having an outlet port and being secured to said engine with its outlet port communicating with the inlet of said water circulating system, said casing having a second outlet port, a valve body secured to said casing and having a chamber therein communicating with said second casing outlet, a valve plug in said chamber and movable therein across said second casing outlet, said valve body having an outlet out of the normal path of movement of said valve plug, said valve body having an inlet adapted to be partially covered by said valve plug, means connecting said valve body inlet to the outlet of said water circulating system, and means external of said valve body for moving said valve plug, said last named means having means thereon for indicating the position of said valve plug with respect to said valve body inlet.

4. In combination with a marine engine having a water circulating system with an inlet and an outlet, a water casing, said water casing having a manifold therein adapted for reception of exhaust gases from said engine and being substantially surrounded by said casing, said casing having an inlet port, water pumping means connected to said inlet port, said casing having an outlet port and being secured to said engine with its outlet port communicating with the inlet of said water circulating system, said casing having a second outlet port, a valve body secured to said casing and having a chamber therein communicating with said second casing outlet, a valve plug in said chamber and movable therein across said second casing outlet, said valve body having an outlet out of the normal path of movement of said valve plug, said valve body having an inlet adapted to be partially covered by said valve plug, means connecting said valve body inlet to the outlet of said water circulating system, and means external of said valve body for moving said valve plug, said last named means having manually releasable means for securing it in positions of adjustment.

5. In combination with a marine engine having an exhaust manifold and a water circulating system with an inlet and an outlet, a water casing substantially surrounding said manifold, said casing having an inlet port, water pumping means connected to said casing inlet port, said casing having an outlet port connected to the circulating system inlet, said casing having a second outlet port remote from the first outlet port, a valve body having an annular chamber, said valve body being secured on said casing with said second outlet port communicating therewith, said valve body having an inlet port, means connecting the outlet of said circulating system with the inlet port in said valve body, said valve body having an outlet port, a valve plug in said valve body adapted to be moved across said casing outlet port and said valve body inlet port to obstruct the same, means for moving said valve plug, and means for restricting movement of said valve plug to prevent movement thereof to a position totally obstructing said valve body inlet port.

6. In combination with a marine engine having an exhaust manifold and a water circulating system with an inlet and an outlet, a water casing substantially surrounding said manifold, said casing having an inlet port, water pumping means connected to said casing inlet port, said casing having an outlet port connected to the circulating system inlet, said casing having a second outlet port remote from the first outlet port, a valve body having an annular chamber, said valve body being secured on said casing with said second outlet port communicating therewith, said valve body having an inlet port, means connecting the outlet of said circulating system with the inlet port in said valve body, said valve body having an outlet port, a valve plug in said valve body adapted to be moved across said casing outlet port and said valve body inlet port to obstruct the same, means for moving said valve plug, and means for restricting movement of said valve plug to prevent movement thereof to a position totally obstructing said valve body inlet port, said last named means comprising a slotted handle, and a set screw extending through the slot therein, said set screw being adapted to positively restrict the movement of said handle and being adapted to frictionally engage the same to hold it in various positions of adjustment.

7. In combination with a marine engine having an exhaust manifold and a water circulating system with an inlet and an outlet, a water casing substantially surrounding said manifold, said casing having an inlet port, water pumping means connected to said casing inlet port, said casing having an outlet port connected to the circulating system inlet, said casing having a second outlet port remote from the first outlet port, a valve body having an annular chamber, said valve body being secured on said casing with said second outlet port communicating therewith, said valve body having an inlet port, means connecting the outlet of said circulating system with the inlet port in said valve body, said valve body having an outlet port, a valve plug in said valve body adapted to be moved across said casing outlet port and said valve body inlet port to obstruct the same, means for moving said valve plug, means for restricting movement of said valve plug to prevent movement thereof to a position totally obstructing said valve body inlet port, and means external of said valve body for indicating the position of said valve plug with respect to said valve body inlet port.

FRANK O. FERNSTRUM.